US007664800B2

(12) United States Patent
Kwon

(10) Patent No.: US 7,664,800 B2
(45) Date of Patent: Feb. 16, 2010

(54) APPARATUS AND METHOD FOR MANAGING RESOURCE ON JAVA ENVIRONMENT

(75) Inventor: Ho-bum Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 11/655,923

(22) Filed: Jan. 22, 2007

(65) Prior Publication Data

US 2007/0226282 A1 Sep. 27, 2007

(30) Foreign Application Priority Data

Feb. 24, 2006 (KR) ............... 10-2006-0018281

(51) Int. Cl.
*G06F 17/30* (2006.01)
(52) U.S. Cl. ..................... 707/206; 719/316
(58) Field of Classification Search ............. 707/206; 719/316
See application file for complete search history.

(56) References Cited

U.S. PATENT DOCUMENTS

| 5,848,423 | A | | 12/1998 | Ebrahaim et al. | |
|---|---|---|---|---|---|
| 6,070,173 | A | * | 5/2000 | Huber et al. | 707/206 |
| 6,671,707 | B1 | | 12/2003 | Hudson et al. | |
| 6,874,074 | B1 | * | 3/2005 | Burton et al. | 711/170 |
| 6,928,460 | B2 | | 8/2005 | Nagarajan et al. | |
| 6,978,285 | B2 | | 12/2005 | Li | |
| 6,996,826 | B2 | * | 2/2006 | Kanamori | 719/316 |
| 7,069,279 | B1 | * | 6/2006 | Rau et al. | 707/206 |
| 7,174,354 | B2 | * | 2/2007 | Andreasson | 707/206 |
| 7,444,484 | B2 | * | 10/2008 | Achanta et al. | 711/159 |
| 2003/0187888 | A1 | | 10/2003 | Hayward | |
| 2003/0196061 | A1 | | 10/2003 | Kawahara et al. | |
| 2004/0168028 | A1 | | 8/2004 | Cierniak | |
| 2007/0150864 | A1 | * | 6/2007 | Goh | 717/113 |

OTHER PUBLICATIONS

Leal, Marcus Amorim et al. "The Weak-Reference Interface" Aug. 4, 2004, 15 pages.
IBM, "Developer Kit and Runtime Environment, Java 2 Technology Edition, Version 1.4.1" pp. 18-19, Apr. 2004. XP002527598.
Pawlan, Monica "Reference Objects and Garbage Collection" Aug. 1, 1998, pp. 1-10.

* cited by examiner

*Primary Examiner*—Debbie M Le
(74) *Attorney, Agent, or Firm*—Sughrue Mion, PLLC

(57) ABSTRACT

Provided are an apparatus for managing resources in a Java environment and a method of managing the same, in which in confirming finalized states of a plurality of reference objects and finalizable objects classified according to accessibility from a program to be currently executed, an order confirming whether the respective objects are finalized is changed. The apparatus includes an accessibility confirming unit confirming whether an object to which a memory resource is allocated is accessible through a route set, an access path confirming unit confirming access paths to the object according to the confirmed result by the accessibility confirming unit, a control unit determining an order of the access paths, and a resource releasing unit releasing the memory resource allocated to the object according to the order of the access paths.

10 Claims, 7 Drawing Sheets

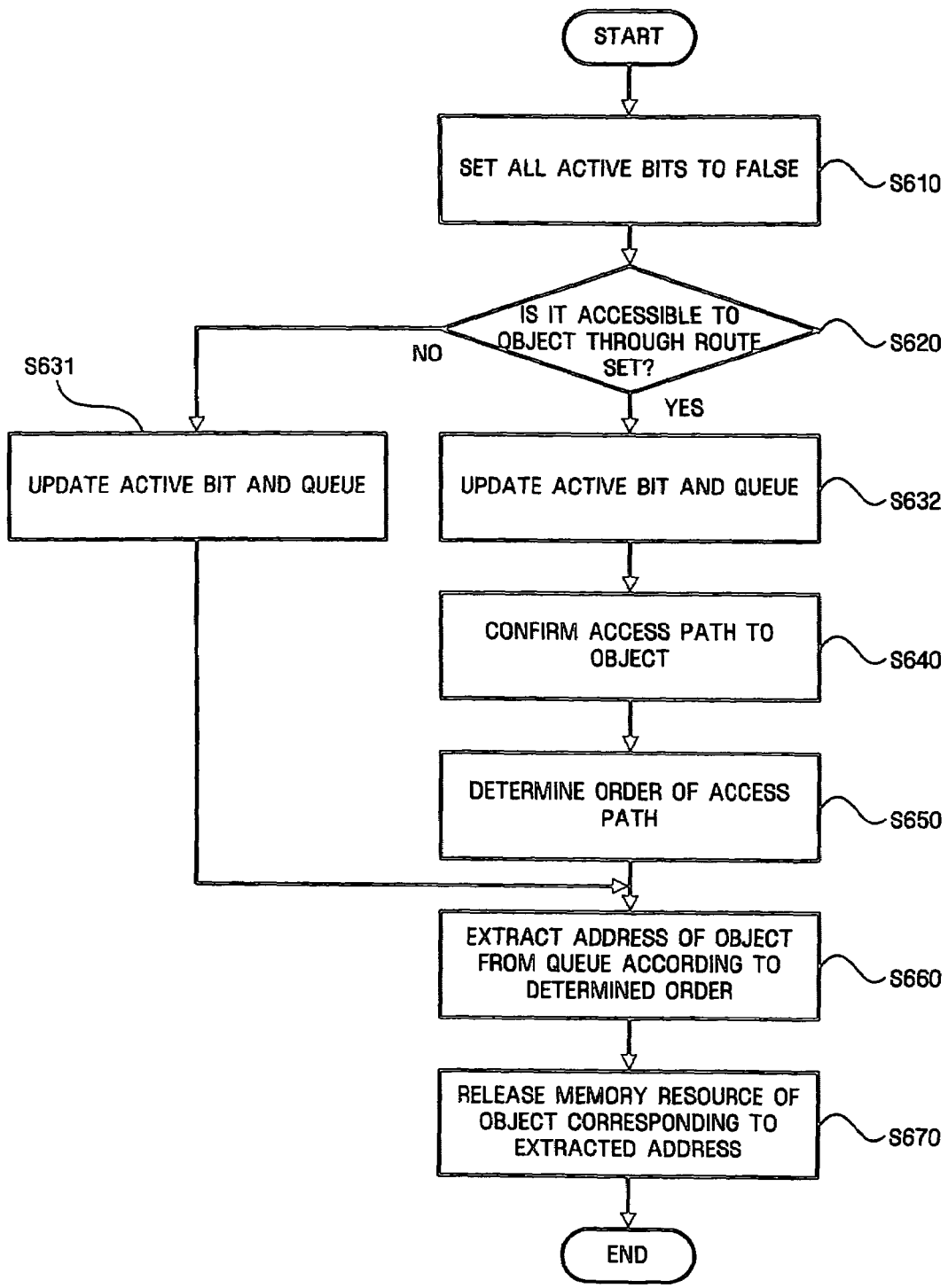

APPARATUS AND METHOD FOR MANAGING RESOURCE ON JAVA ENVIRONMENT

CROSS REFERENCE TO RELATED APPLICATION

This application claims priority from Korean Patent Application No. 10-2006-0018281 filed on Feb. 24, 2006, in the Korean Intellectual Property Office, the disclosure of which is incorporated herein by reference in its entirety.

BACKGROUND OF THE INVENTION

1. Field of the Invention

Apparatuses and methods consistent with the present application relate to managing resources in a Java environment. More particularly, apparatuses and methods consistent with the present invention relate to managing resources in a Java environment, in which in confirming finalized states of a plurality of reference objects and finalizable objects classified according to accessibility from a program to be currently executed, an order confirming whether the respective objects are finalized is changed, such that resources allocated to objects accessible through the reference objects are effectively used.

2. Description of the Related Art

Java is an object-oriented programming language that runs written code in a platform independent manner. Here, the platform means hardware on which a program executes, or a software environment, such as an operating system. The code written in Java is compiled into a Java byte code by a Java compiler. The Java byte code is executed by a Java virtual machine that is ported to a variety of hardware-based platforms.

FIG. 1 is a diagram illustrating a Java virtual machine according to the related art. A Java virtual machine 10 includes an interpreter 11, a garbage collector 12, a class loader 13, and a run-time system 14.

An instance for a class is referred to as an object. When one object is created, a portion of a heap region of a memory is allocated to the created object. In addition, when the corresponding object disappears, the garbage collector 12 releases the resource allocation of the corresponding memory region, such that another program or object can freely use the resource.

At the time of releasing the resource allocation, the garbage collector 12 confirms whether all objects to which memory resources of the heap regions have been allocated are finalized, and then releases the resources allocated to all of the finalized objects. In this case, the garbage collector 12 confirms whether access is possible from a program currently being executed so as to confirm whether the corresponding object is finalized. That is, the garbage collector 12 determines that accessible objects through a root set of a thread are not finalized, and determines that inaccessible objects through the root set of the thread are finalized.

There are objects that are accessible from the root set through an instance of a class (hereinafter, referred to as "reference object") to which a reference class is inherited. These objects are classified into objects that are inaccessible from the root set, and the resource allocation for the corresponding memory region is released by the garbage collector 12.

In this case, the reference objects are classified into a soft reference object, a weak reference object, and a phantom reference object, and access to the objects may be classified into four types according to the access methods from the root set. That is, access to the objects are classified into access from the other objects excluding the reference object, access from the soft reference object, access from the weak reference object, and access from the phantom reference object.

FIG. 2 is a diagram illustrating a state in which objects are finalized according to the related art. The state includes a finalizable state 21, a finalizing state 22, a finalized state 23, and a returned state 24. The object in which a state change can be made is referred to as a finalizable object.

The finalizable state 21 means a state in which the object is created and being executed, the finalizing state 22 means a state in which the object is finalizing as a finalize function is executed, the finalized state 23 means a state in which the resource allocated to the corresponding object can be released by the garbage collector 12 as the execution of the finalize function is finalized, and the returned state 24 means a state in which the resources allocated to the corresponding object are released from the memory region.

In order to confirm whether the object to which the memory resource of the heap region is allocated is finalized, the garbage collector 12 sets all of the bits indicating whether the object is active (hereinafter, referred to as active bit) to false, and then starts to confirm all objects that are accessible from the route set. Then, if the object to be a confirm target is accessible from the route set, the garbage collector 12 sets the active bit of the corresponding object to true, and removes it from the resource releasing target.

A queue for each reference object may exist depending on whether a Java virtual machine is implemented. When the object to be the confirm target is accessible through the reference object, the garbage collector 12 inputs the address of the corresponding object to the queue corresponding to the type of the reference object. At this time, since the object accessible through the reference object is not a strongly accessible object, the active bit of the corresponding object is maintained as false.

When it is confirmed that the object is finalized, the garbage collector 12 inputs the address of the object, which is not strongly accessible, to the queue of the finalizable object.

In addition, the garbage collector 12 performs a resource releasing job for the objects corresponding to the collected addresses in the order of the queue of the soft reference object, the queue of the weak reference object, the queue of the finalizable object, and the queue of the phantom reference object. That is, the garbage collector 12 extracts the addresses input to the queue of the soft reference object, the queue of the weak reference object, and the queue of the phantom reference object, then sets the objects corresponding to the respective addresses to NULL, and sets active bits of the object corresponding to the address input to the queue of the finalizable object and all objects to be accessible from the object to true. This is because the objects finalized by the finalize function, that is, a finalizable object and the objects accessible by the finalizable object should be in an active state.

Meanwhile, when a certain object is a strongly accessible object and is an object accessible through the reference object (hereinafter, common object), the garbage collector 12 sets the common objects corresponding to the addresses extracted from the queue of the soft reference object and the queue of the weak reference object to NULL, and sets the active bit of the common object of the address extracted from the queue of the finalizable object to true. That is, after the same object (common object) is set to NULL, the active bit of the same object is set to true, and the memory resource allocated to the same object exists in a heap region. This state is maintained until the state of the object is a finalized state 23. Therefore, the memory resources that are not accessible through the reference object exist in the heap region resulting in wasted resources.

U.S. Pat. No. 6,070,173 discloses a method in which an actual object heap and a virtual object heap larger than the actual object heap are formed, a Java application object is allocated to the virtual object heap, and the garbage collection is performed in the virtual object heap.

However, according to the method disclosed in U.S. Pat. No. 6,070,173, since the heap region is virtually extended, there is no disclosure of a method preventing the generation of memory resources that are not accessible through the reference object.

Accordingly, a method has been strongly required where memory resources, which are not released in the resource releasing process by the garbage collector 12 and are not accessible, are prevented from being generated.

SUMMARY OF THE INVENTION

The present invention provides an apparatus and method for managing resources in a Java environment, in which the order of confirming finalized states of a plurality of reference objects and finalizable objects classified according to accessibility from a program to be currently executed is changed, the order confirming whether the respective objects are finalized is changed, such that access to objects accessible through the reference objects is easier and the finalizable objects are effectively used.

According to an aspect of the invention, provided is an apparatus for managing resources in a Java environment, the apparatus including an accessibility confirming unit confirming whether an object to which a memory resource is allocated is accessible through a route set, an access path confirming unit confirming access paths to the object according to the confirmed result by the accessibility confirming unit, a control unit determining an order of the access paths, and a resource releasing unit releasing the memory resource allocated to the object according to the order of the access paths.

According to another aspect of the invention, there is provided a method of managing resources in a Java environment, the method includes confirming whether an object to which a memory resource is allocated is accessible through a route set, confirming access paths to the object according to the confirmed result, determining an order of the access paths, and releasing the memory resource allocated to the object according to the order of the access paths.

BRIEF DESCRIPTION OF THE DRAWINGS

The above and other aspects of the invention will become more apparent by describing in detail exemplary embodiments thereof with reference to the attached drawings, in which:

FIG. 6 is a flowchart illustrating a process of managing resources in a Java environment according to an exemplary embodiment of the invention.

DETAILED DESCRIPTION OF THE EXEMPLARY EMBODIMENTS OF THE PRESENT INVENTION

Figure 1:
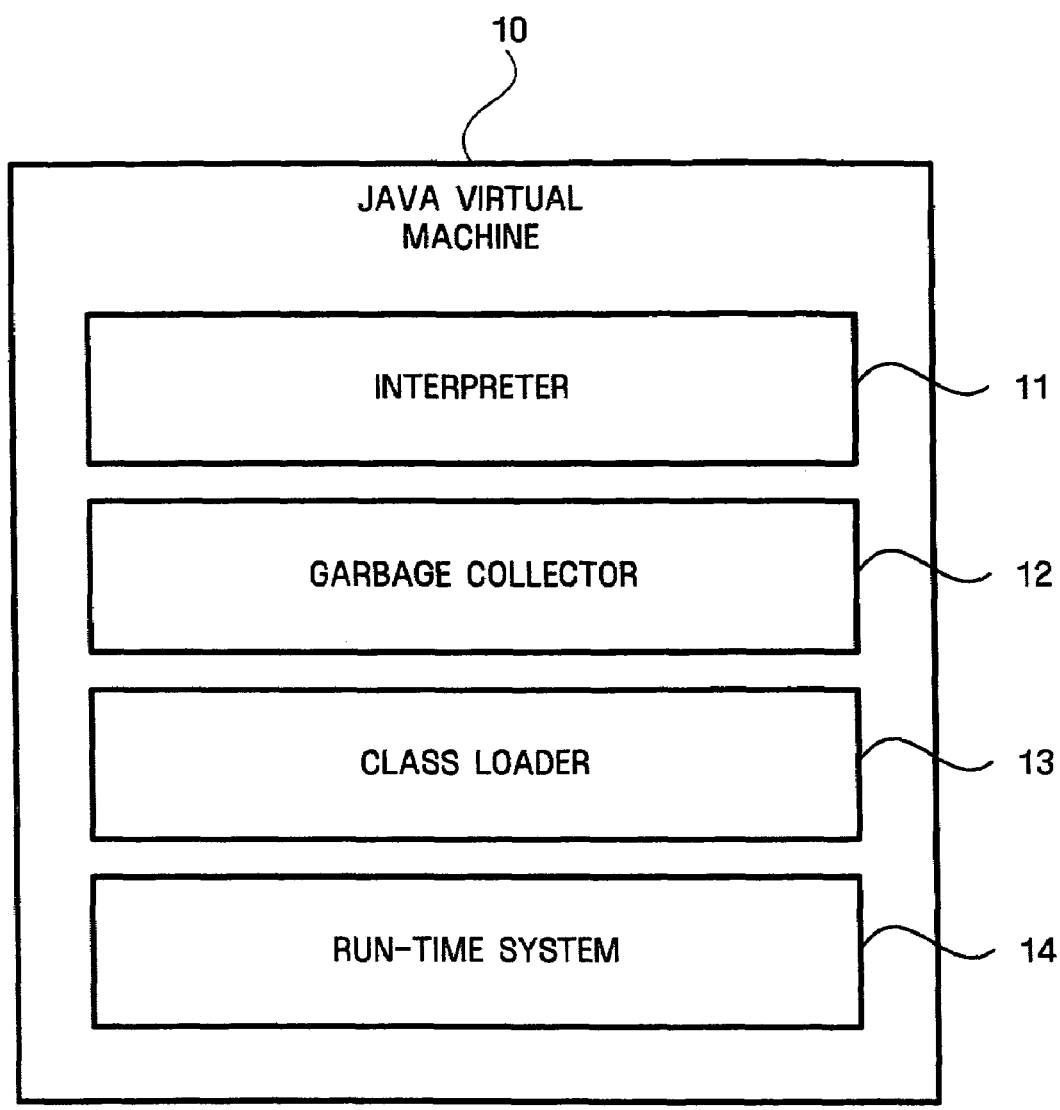
FIG. 1 is a diagram illustrating a Java virtual machine according to the related art.
Figure 2:
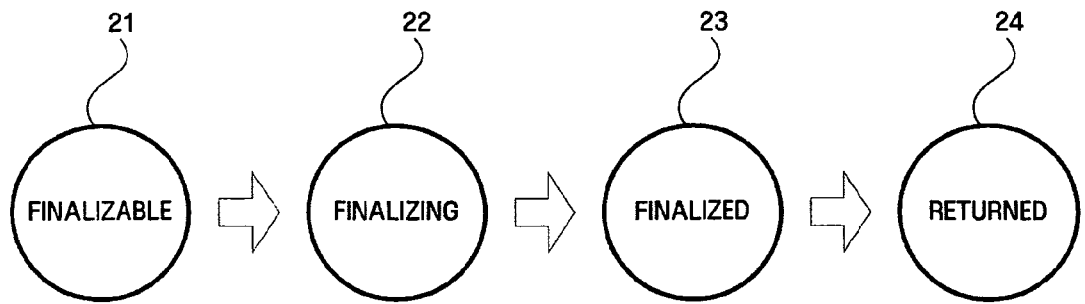
FIG. 2 is a diagram illustrating a state in which objects are finalized according to the related art.

Aspects of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

Figure 3:
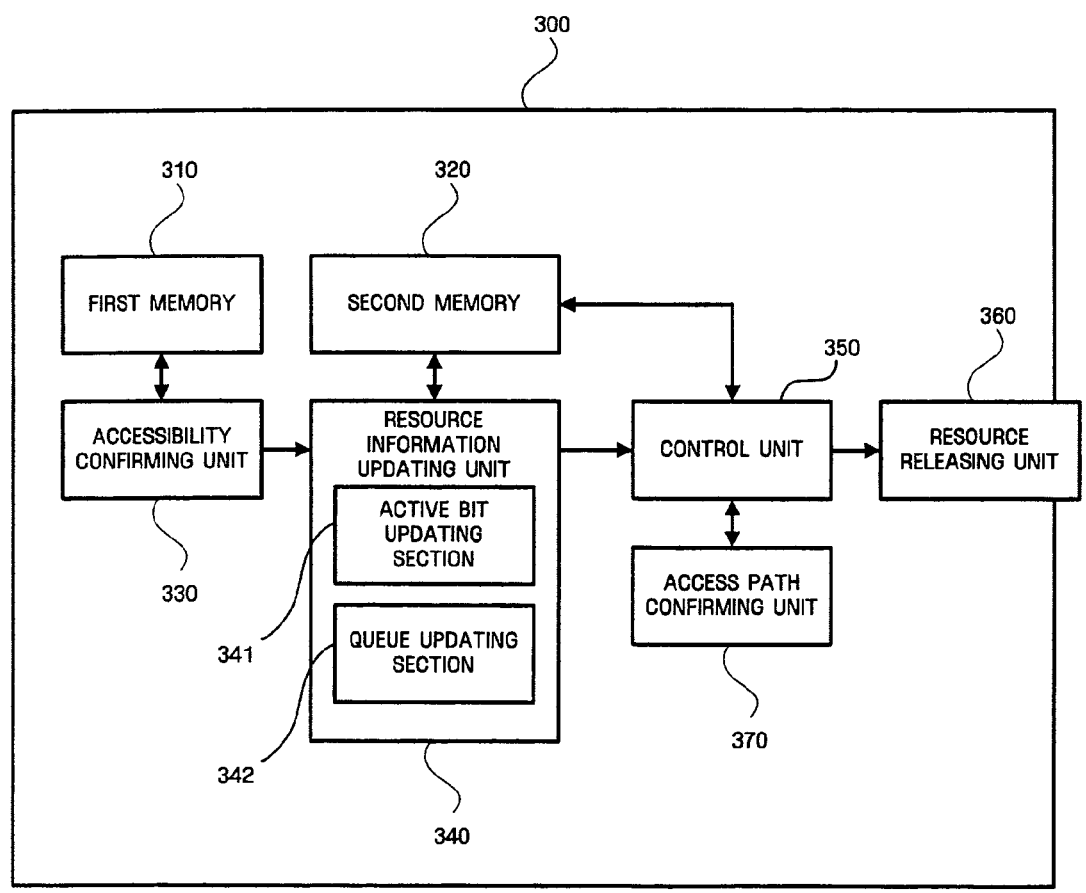
FIG. 3 is a block diagram illustrating an apparatus for managing resources in a Java environment according to an exemplary embodiment of the invention.

FIG. 3 is a block diagram illustrating an apparatus for managing resources in a Java environment according to an exemplary embodiment of the invention. An apparatus for managing resources in a Java environment 300 (hereinafter, referred to as resource managing apparatus) includes a first memory 310, a second memory 320, an accessibility confirming unit 330, a resource information updating unit 340, a control unit 350, a resource releasing unit 360, and an access path confirming unit 370.

Hereinafter, it is assumed that an operation of the resource managing apparatus 300 is implemented by a Java program. However, it is only exemplary, and the resource managing apparatus 300 may be implemented by other programs.

The first memory 310 provides memory resources so as to be allocated to a created object. A memory region of the first memory 310 includes a code region, a data region, a heap region, and a stack region.

The code region is a memory region that constructs codes, a region where application program commands are located, and a memory region that is controlled by a machine language.

Data is stored in the data region. For example, a global variable, a static variable, and various initialized arrays and structure materials are stored in the data region.

The heap region refers to a memory region that is allocated by a programmer. For example, a memory region allocated by using a function for allocating a memory corresponds to the heap region. When an object is created, the heap region of the memory regions of the first memory 310 is allocated to the created object.

The stack region corresponds to a temporary memory region that is automatically used by an application program. That is, the stack region is used when automatic variables are stored or a factor is transmitted to a function, or when a return address is stored.

In the memory region allocated to one object, bits indicating whether the object is active or not (hereinafter, referred to as active bit) may be included. The active bit may have a value of true or false according to whether the object is active or not. That is, if the object is active, the active bit has a value of true, and if the object is inactive, the active bit has a value of false. An object having a value of true is excluded from resource releasing targets, and resource release is performed only on objects having a value of false.

The second memory 320 stores an address of an object. When the operation of the resource managing apparatus 300 is implemented by a Java program, the objects include objects (hereinafter, referred to as first object) accessible through finalizable objects and objects (hereinafter, referred to as second object) accessible through reference objects.

Here, the reference objects are instances of classes to which reference classes are inherited. The reference objects are classified into soft reference objects, weak reference objects, and phantom reference objects according to access methods of a specific object.

The first object refers to an object that is accessible through objects other than the reference object, and an object that is not strongly accessible from a route set according to execution of a finalize function.

According to whether a Java virtual machine is implemented, queues for each reference object and each finalizable object may exist. This queue is located in the second memory 320 such that addresses of the first object and the second object may be stored.

FIG. 3 shows a structure in which the first memory 310 and the second memory 320 are separately provided, but it is only one example. That is, one storage unit may perform functions of the first memory 310 and the second memory 320, and a portion or all of the data stored in the respective memories may be managed by a separate storage unit connected through a network.

The accessibility confirming unit 330 confirms whether objects having allocated memory resources are accessible through a route set. In this case, the route set includes a collection of all objects accessible through the reference.

The memory regions that are allocated to the objects exist in the heap region of the first memory 310, and the accessibility confirming unit 330 confirms whether the objects are accessible through the route set.

The resource information updating unit 340 updates the active bits that are stored in the first memory 310, and the queue that is stored in the second memory 320. In order to perform this function, the resource information updating unit 340 may include an active bit updating section 341 and a queue updating section 342. When the accessibility confirming unit 330 starts to confirm the accessibility of the objects, the active bit updating section 341 sets all of the active bits stored in the first memory 310 to false. Then, when the object confirmed by the accessibility confirming unit 330 is accessible from the route set, the active bit updating section 341 resets the active bits to true, and when the object confirmed by the accessibility confirming unit 330 is not accessible from the route set, the active bit updating section 341 maintains the active bits as false.

When the corresponding object is accessible through the reference object, the queue updating section 342 inputs an address of the corresponding object to a queue corresponding to a type of the reference object, and inputs an address of an object that is not strongly accessible from the route set to a queue of the finalizable object.

The access path confirming unit 370 confirms an access path to the object according to the confirmed result by the accessibility confirming unit 330. That is, when it is confirmed that access to the object is possible, the access path confirming unit 370 confirms the access path to the corresponding object.

In this case, the access path includes a path access to the corresponding object through the reference object which is an instance of a class to which the reference class is inherited or a finalizable object. That is, the access path includes paths through a soft reference object, a weak reference object, a phantom reference object, and the finalizable object.

The control unit 350 determines an order of access paths. Here, when determining the order of the access path, the control unit 350 may determine the order of the access paths such that the access path through the finalizable object has a higher priority order than the access path through the reference object. For example, the control unit 350 can determine the order of the access paths in the order of the finalizable object, the soft reference object, the weak reference object, and the phantom reference object. Therefore, when the same object is accessible through the reference object and the finalizable object, it is possible to prevent the allocation of the corresponding resources, which are generated by performing a resource releasing process of the first object after a resource releasing process of the second object, from existing on the memory.

That is, in a method according to the related art, in the process of releasing the resource of the second object, the second object is set to NULL, and in the process of releasing the resource of the first object, the active bit of the first object is set to true according to the execution of a finalize function. Since the first object is the same as the second object, the access from the reference object is not possible, but a state in which a portion of the heap region is allocated to the corresponding object is maintained.

According to the order of the access paths determined by the control unit 350, in the process of releasing the resource of the first object, the active bit of the first object is set to true according to the execution of the finalize function, and when a job of the finalize function is finalized, the resource allocated to the first object is released. In addition, since the second object is set to NULL in the process of releasing the resource of the second object, the problems according to the related art are not generated.

When the accessibility conforming unit confirms accessibility of all of the objects to which the resources of the first memory 310 are allocated, the control unit 350 extracts the addresses input to the queue of the reference object and the queue of the finalizable object from the second memory 320, and transmits them to the resource releasing unit 360.

Then, the resource releasing unit 360 releases the memory resources that are allocated to the objects corresponding to the transmitted addresses. That is, the resource releasing unit 360 may set the second object to NULL so as to release the resource or returns the right to use a memory region allocated to the first object to the operating system so as to release the resource.

When the process of releasing the resource of the second object has a higher priority than the process of releasing the resource of the first object, the memory resources may be wasted, as in the related art. However, the resource releasing unit 360 performs resource release according to the order of the resource release determined by the control unit 350. The process of releasing the resource of the first object has a higher priority than the process of releasing the resource of the second object. Therefore, the memory resources are not wasted.

Figure 4:
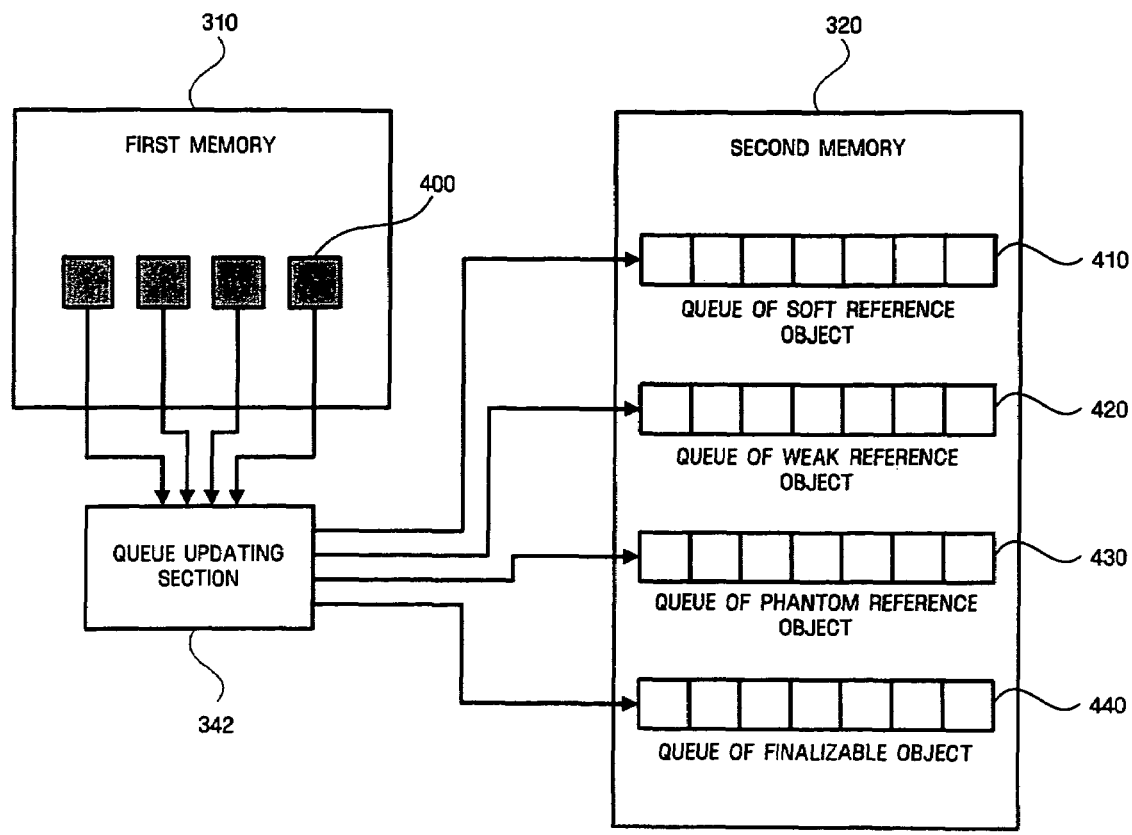
FIG. 4 is a diagram illustrating a queue according to an exemplary embodiment of the invention.

FIG. 4 is a diagram illustrating a queue according to an exemplary embodiment of the invention, which illustrates memory regions of the objects stored in the first memory 310, and queues 410, 420, 430, and 440 stored in the second memory 320.

The queue refers to a material structure in which data is processed in a First-In First-Out (FIFO) manner where the data is removed in an input order.

When the object 400 confirmed by the accessibility confirming unit 330 is not strongly accessible from the route set, that is, when the object 400 is accessible through the finalizable object or the reference object, the accessibility confirming unit 330 transmits the address of the corresponding object 400 to the queue updating section 342, and the queue updating section 342 inputs the addresses of the corresponding objects 400 to the queues 410, 420, 430, and 440 included in the second memory 320.

The queues 410, 420, 430, and 440 of the second memory 320 may be classified into four queues according to access types of the object 400. That is, the queues of the second memory 320 may be classified into a queue of a soft reference object 410, a queue of a weak reference object 420, a queue of a phantom reference object 430, and a queue of a finalizable object 440.

Therefore, the queue updating section 342 inputs the address of the corresponding object 400 to each of the queues that are classified according to the access type. That is, when the corresponding object 400 is accessible through the soft reference object, the queue updating section 342 inputs the address of the corresponding object to the queue of the soft reference object 410. When the corresponding object 400 is accessible through the weak reference object, the queue updating section 342 inputs the address of the corresponding object to the queue of the weak reference object 420. When the corresponding object 400 is accessible through the phantom reference object, the queue updating section 342 inputs the address of the corresponding object to the queue of the phantom reference object 430. When the corresponding object 400 is accessible through the finalizable object, the queue updating section 342 inputs the address of the corresponding object to the queue of the finalizable object 440.

The addresses of the objects input to the queues are extracted by the control unit 350. The control unit 350 may extract the addresses of the objects 400 according to the order determined by the control unit 350 regardless of the order of the queues to which the addresses of the objects 400 are input. For example, even if the addresses of the objects 400 are input in the order of the queue of the soft reference object 410, the queue of the weak reference object 420, the queue of the finalizable object 430, and the queue of the phantom reference object 440, the control unit 350 may extract the addresses of the objects 400 in the order of the queue of the finalizable object 440, the queue of the soft reference object 410, the queue of the weak reference object 420, and the queue of the phantom reference object 430.

Figure 5A:
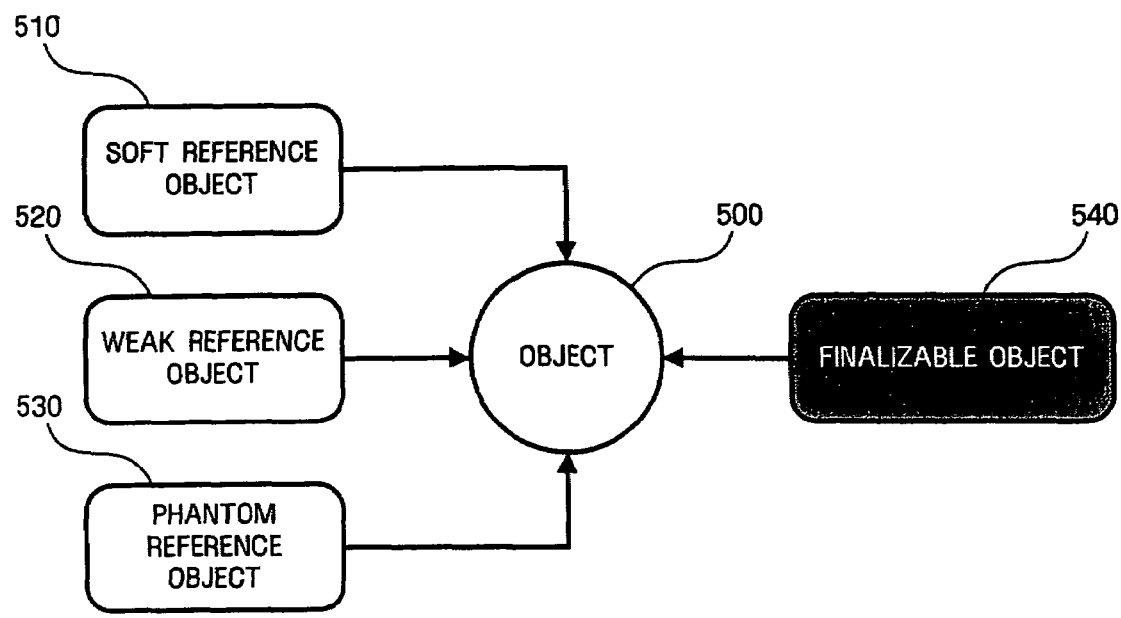
FIGS. 5A to 5E are conceptual diagrams illustrating a case that resources are released in an order according to an exemplary embodiment of the invention.

FIGS. 5A to 5E are conceptual diagrams illustrating a case in which resources are released according to the order according to the exemplary embodiment of the invention. FIG. 5A is a diagram illustrating a case in which a resource releasing job (hereinafter, referred to as first resource release) of the object accessible through the finalizable object 540 is performed on one object 500 accessible through the finalizable object 540, the soft reference object 510, the weak reference object 520, and the phantom reference object 530.

When the first resource release is performed, the finalize function included in the object 500 is executed, and the active bit of the object 500 is set to true according to the execution of the finalize function. That is, the object 500 becomes an object that is strongly accessible from the route set. In addition, the state of the object 500 becomes a finalized state via a finalizable state and a finalizing state. As the state of the object 500 becomes a finalized state, the active bit is set to false, and the address of the object 500 is input to the queue of the finalizable object 440.

Then, the address of the object 500 that is input to the queue of the finalizable object 440 is extracted by the control unit 350 and then transmitted to the resource releasing unit 360, and the resource releasing unit 360 returns the memory region of the corresponding address to the operating system so as to release the resource. As a result, the object 500 does not become accessible from the finalizable object 540, and as shown in FIG. 5B, the object 500 is accessible through the soft reference object 510, the weak reference object 520, and the phantom reference object 530.

Figure 5B:
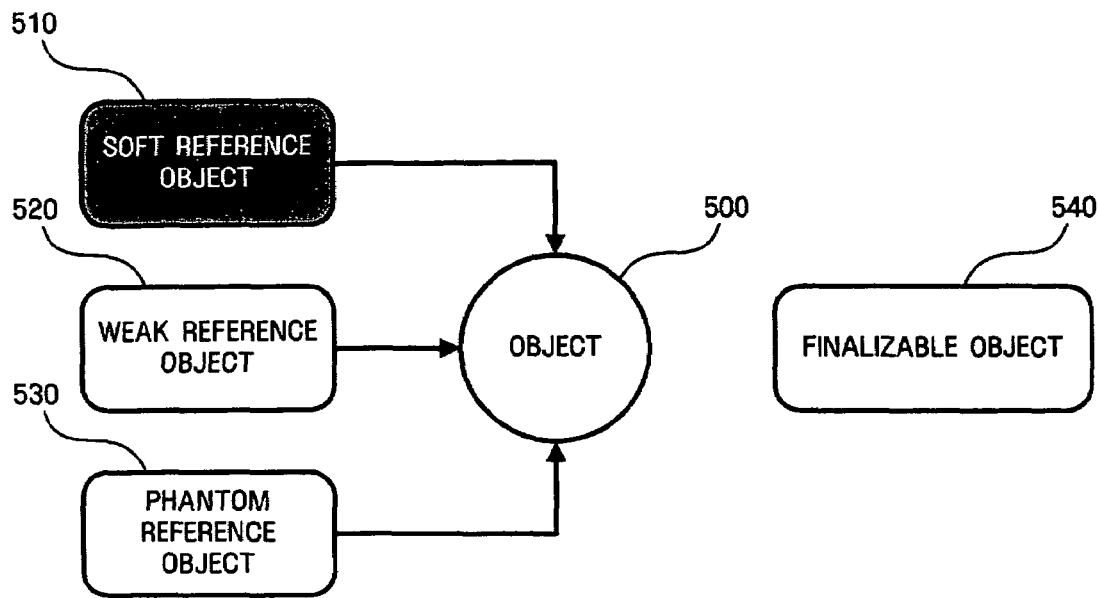

FIG. 5B is a diagram illustrating a case in which a resource releasing job (hereinafter, referred to as second resource release) of an object accessible through the soft reference object 510 is performed.

When the second resource release is performed, the active bit of the object 500 is maintained as false, and the address of the object 500 is input to the queue of the soft reference object 410. As described above, when the accessibility confirming unit 330 starts to perform an accessibility confirming job of the object, the active bit updating section 341 sets all of active bits stored in the second memory 320 to false. Therefore, the active bit updating section 341 does not need to update the active bit of the object 500, when the second resource release is performed.

Then, the address of the object 500 that is input to the queue of the soft reference object 410 is extracted by the control unit 350 and then transmitted to the resource releasing unit 360, and the resource releasing unit 360 sets the object 500 to NULL. As a result, the object 500 does not become accessible from the soft reference object 510, and as shown in FIG. 5C, the object 500 is accessible through the weak reference object 520 and the phantom reference object 530.

Figure 5C:
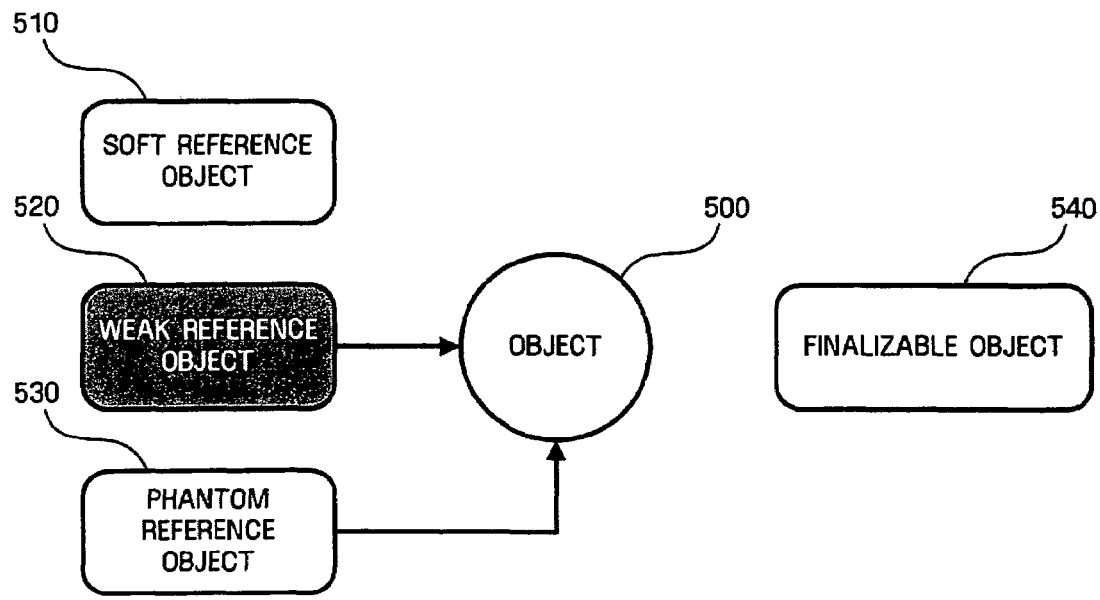

FIG. 5C is a diagram illustrating a case in which a resource releasing job (hereinafter, referred to as third resource release) of an object accessible through the weak reference object 520 is performed.

When the third resource release is performed, the active bit of the object 500 is maintained as false, and the address of the object 500 is input to the queue of the weak reference object 420.

Then, the address of the object 500 that is input to the queue of the weak reference object 420 is extracted by the control unit 350 and then transmitted to the resource releasing unit 360, and the resource releasing unit 360 sets the object 500 to NULL. As a result, the object 500 does not become accessible from the weak reference object 520, and as shown in FIG. 5D, the object 500 is accessible through the phantom reference object 530.

Figure 5D:
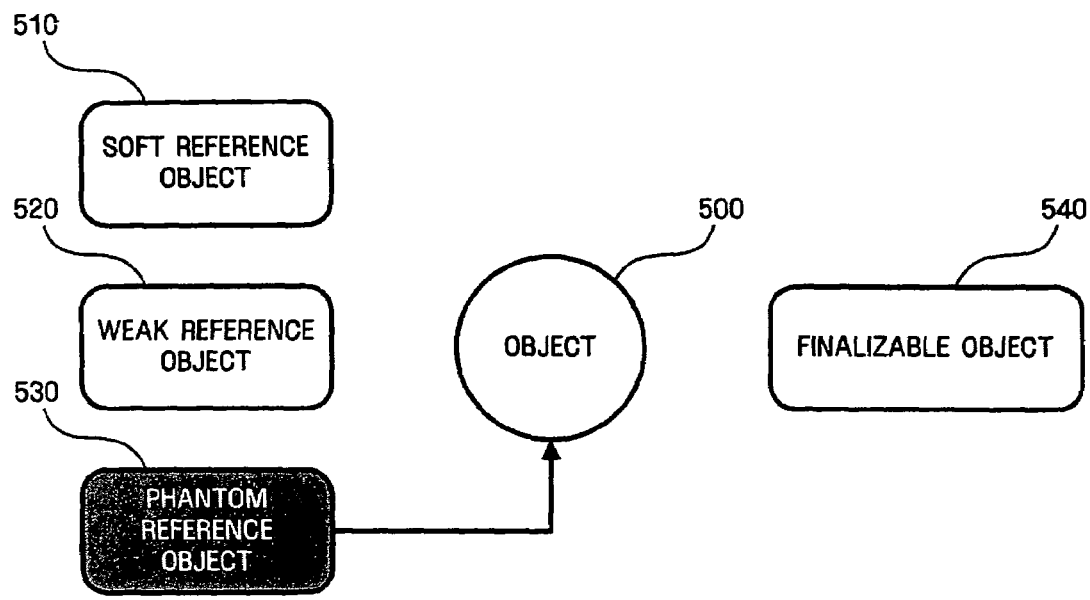

FIG. 5D is a diagram illustrating a case in which a resource releasing job (hereinafter, referred to as fourth resource release) of an object accessible through the phantom reference object 530 is performed.

When the fourth resource release is performed, the active bit of the object 500 is maintained as false, and the address of the object 500 is input to the queue of the phantom reference object 430.

Figure 5E:
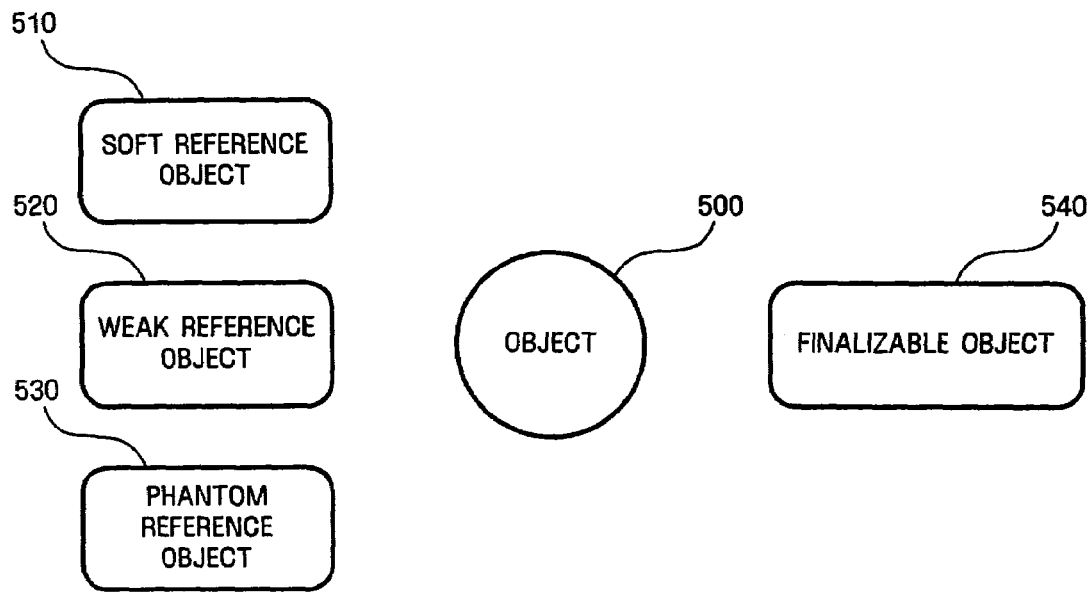

Then, the address of the object 500 that is input to the queue of the phantom reference object 430 is extracted by the control unit 350 and then transmitted to the resource releasing unit 360, and the resource releasing unit 360 sets the object 500 to NULL. As a result, the object 500 does not become accessible from the phantom reference object 530, and as shown in FIG. 5E, all of the access paths to the object 500 are removed, and the resource releasing job of the memory resource that is allocated to the object 500 is finalized.

FIG. 6 is a flowchart illustrating a process of managing resources in a Java environment according to the exemplary embodiment of the invention.

In order to manage the resources in the Java environment, the active bit updating section 341 of the resource information updating unit 340 firstly sets all of active bits stored in the first memory 310 to false (operation S610).

Then, the accessibility confirming unit 330 of the resource managing apparatus 300 confirms whether the object to which the memory resource is allocated is accessible through the route set (operation S620).

The information of the confirmed object is transmitted to the resource information updating unit 340, and the resource information updating unit 340 updates the active bits of the objects stored in the first memory 310 and the queues stored in the second memory 320 (operations S631 and S632). In this case, when the corresponding object is accessible through the reference object, the queue updating section 342 of the resource information updating unit 340 inputs the address of the corresponding object to a queue corresponding to a type of the reference object, and inputs the address of the object that is not strongly accessible from the route set to the queue of the finalizable object 440.

Then, the access path confirming unit 370 confirms the access path to the object according to the confirmed result by the accessibility confirming unit 330 (operation S640). That is, when it is confirmed that access to the object is possible, the access path confirming unit 370 confirms the access path to the corresponding object.

Here, the access path includes paths that access the corresponding object through the soft reference object, the weak reference object, the phantom reference object, and the finalizable object.

Then, the control unit 350 determines the order of the access paths (operation S650). That is, the control unit 350 determines the order of the access paths according to the types of the access paths as the order for releasing the memory resources. At this time, the control unit 350 may determine the order of the access paths such that the access path through the finalizable object has a higher priority than the access path through the reference object. That is, the control unit determines the order of the access paths such that the resource releasing job of the first object has a higher priority than the resource releasing job of the second object. For example, the control unit 350 may determine the order of the access paths in the order of the finalizable object, the soft reference object, the weak reference object, and the phantom reference object. Also, the order of the access paths that is determined by the control unit 350 may be input in advance by a user.

Then, the control unit 350 extracts the addresses of the objects from the queues stored in the second memory 320 according to the determined order (operation S660). That is, the control unit 350 firstly extracts the address of the object that is stored in the queue of the finalizable object 440, and then extracts the addresses of the objects in the order of the queue of the soft reference object 410, the queue of the weak reference object 420, and the queue of the phantom reference object 430.

The extracted addresses are transmitted to the resource releasing unit 360, and the resource releasing unit 360 releases the memory resources allocated to the objects according to the transmitted order (operation S670). That is, the right to use the memory region allocated to the first object is returned to the operating system so as to perform the resource release, and then the second object is set to NULL so as to perform the resource release. Since the resource release has been described in detail with reference to FIGS. 5A and 5E, the repetitive description is omitted.

It is to be understood that blocks in the accompanying block diagrams of FIG. 3 and compositions of steps in a flow chart of FIG. 6 can be performed by computer program instructions. These computer program instructions can be provided to processors of, for example, general-purpose computers, special-purpose computers, and programmable data processing apparatuses. Therefore, the instructions performed by the computer or the processors of the programmable data processing apparatus generate means for executing functions described in the blocks in block diagrams or the steps in the flow charts. The computer program instructions can be stored in a computer available memory or a computer readable memory of the computer or a programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Also, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions). It should be noted that, in some modifications of the invention, the functions described in the blocks or the steps may be generated out of order. For example, two blocks or steps continuously shown can be actually performed at the same time, or they can be performed sometimes in reverse order according to the corresponding functions.

Although the invention has been described in connection with the exemplary embodiments of the invention, it will be apparent to those skilled in the art that various modifications and changes may be made thereto without departing from the scope and spirit of the invention. Therefore, it should be understood that the above exemplary embodiments are not limitative, but illustrative in all aspects.

According to the apparatus for managing resources in a Java environment and the method of managing the same, the following can be achieved.

According to one aspect of the invention, the order is changed in which the finalized states of the reference object and the finalizable object are confirmed so as to improve accessibility to the objects accessible through the reference object and the finalizable object. Therefore, it is possible to reduce the waste of memory resources.

According to another aspect of the invention, by providing improved accessibility to the objects accessible through the reference object and the finalizable object, it is possible to reduce an erroneous operation occurring due to a state where the access to the corresponding memory resources is not possible.

What is claimed is:

1. An apparatus for managing resources in a Java environment, the apparatus comprising:
a processor comprising:
an accessibility confirming unit which confirms accessibility of an object, to which a memory resource is allocated, through a route set;
an access path confirming unit which confirms access paths to the object according to a result of the confirmation by the accessibility confirming unit;
a control unit which determines an order of the access paths; and a resource releasing unit which releases the memory resource allocated to the object according to the order of the access paths, wherein the route set comprises a collection of objects accessible as reference objects, and wherein one of the access paths accesses a corresponding object through one of a reference object, which is an instance of a class to which a reference class is inherited, and a finalizable object.

2. The apparatus of claim 1, wherein the reference object comprises at least one of a soft reference object, a weak reference object, and a phantom reference object.

3. The apparatus of claim 1, wherein the order of the access paths is constructed wherein a first access path through the finalizable object has a priority which is higher than a priority of a second access path through the reference object.

4. The apparatus of claim 1, wherein the resource releasing unit sets an object accessible through the reference object to NULL to release the resource.

5. The apparatus of claim 1, wherein the resource releasing unit returns a right to use a memory region allocated to an object accessible through the finalizable object in order to perform the resource release.

6. A method of managing resources in a Java environment, the method comprising:

confirming by a processor whether an object to which a memory resource is allocated is accessible through a route set;

confirming access paths to the object according to a result of the confirming whether the object is accessible;

determining an order of the access paths; and releasing the memory resource allocated to the object according to the order of the access paths, wherein the route set comprises a collection of objects accessible as reference objects, and wherein one of the access paths accesses a corresponding object through one of a reference object, which is an instance of a class to which a reference class is inherited, and a finalizable object.

7. The method of claim 6, wherein the reference object comprises at least one of a soft reference object, a weak reference object, and a phantom reference object.

8. The method of claim 6, wherein the order of the access paths is constructed wherein a first access path through the finalizable object has a priority which is higher than a priority of a second access path through the reference object.

9. The method of claim 6, wherein the releasing of the resource comprises setting an object accessible through the reference object to NULL.

10. The method of claim 6, wherein the releasing of the resource comprises returning a right to use a memory region allocated to an object accessible through the finalizable object.

* * * * *